United States Patent
Matsui (10) Patent No.: US 11,661,179 B2
(45) Date of Patent: May 30, 2023

(54) VERTICAL TAKE-OFF AND LANDING AIRCRAFT AND WING APPARATUS

(71) Applicant: SUBARU CORPORATION, Tokyo (JP)

(72) Inventor: Yuki Matsui, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 67 days.

(21) Appl. No.: 17/478,142

(22) Filed: Sep. 17, 2021

(65) Prior Publication Data
US 2022/0097835 A1 Mar. 31, 2022

(30) Foreign Application Priority Data

Sep. 28, 2020 (JP) .............................. JP2020-161808

(51) Int. Cl.
| | |
|---|---|
| *B64C 29/00* | (2006.01) |
| *B64C 39/02* | (2023.01) |
| *B64C 11/00* | (2006.01) |
| *B64D 27/24* | (2006.01) |
| *B64C 39/00* | (2023.01) |

(52) U.S. Cl.
CPC ........ *B64C 29/0025* (2013.01); *B64C 11/001* (2013.01); *B64D 27/24* (2013.01); *B64C 2039/105* (2013.01)

(58) Field of Classification Search
CPC .............. B64C 29/0025; B64C 11/001; B64C 2039/105; B64D 27/20
See application file for complete search history.

(56) References Cited

U.S. PATENT DOCUMENTS

| | | | | |
|---|---|---|---|---|
| 3,179,353 A | * | 4/1965 | Peterson | B64C 29/0025 244/12.3 |
| 4,828,203 A | * | 5/1989 | Clifton | B64C 29/0033 244/12.3 |
| 6,561,456 B1 | * | 5/2003 | Devine | B64C 29/0025 244/12.3 |
| 9,714,090 B2 | * | 7/2017 | Frolov | B64D 9/00 |
| 11,034,443 B2 | * | 6/2021 | Frolov | B64C 17/08 |

(Continued)

FOREIGN PATENT DOCUMENTS

WO 2006/103774 A1 10/2006

*Primary Examiner* — Brian M O'Hara
(74) *Attorney, Agent, or Firm* — McDermott Will & Emery LLP (57) ABSTRACT

A vertical take-off and landing aircraft includes a wing body, a duct, a rotary wing, upper-surface hinges, and upper-surface covers. The upper-surface hinges are provided at an upper-surface opening of the duct. The upper-surface covers are pivotally supported by the upper-surface hinges, and configured to cause the upper-surface opening to be open and closed. The upper-surface covers are configured to pivot, upon forward moving of the aircraft, in a closing direction by negative pressure generated on an upper surface side of the wing body, to cause the upper-surface opening to be closed. The upper-surface covers are configured to pivot, upon hovering of the aircraft, in an opening direction by pressure of an airflow flowing in the duct from the upper side to a lower side in accordance with rotation of the rotary wing, own weights of the upper-surface covers, or both, to cause the upper-surface opening to be open.

9 Claims, 2 Drawing Sheets

(56) References Cited

U.S. PATENT DOCUMENTS

| | | | |
|---|---|---|---|
| 11,203,412 B2* | 12/2021 | Lee | ........................ B64C 11/001 |
| 11,358,714 B2* | 6/2022 | Bender | ................... B64C 29/00 |
| 2008/0169375 A1 | 7/2008 | Ishikawa | |
| 2022/0097835 A1* | 3/2022 | Matsui | ................... B64C 11/001 |

* cited by examiner

VERTICAL TAKE-OFF AND LANDING AIRCRAFT AND WING APPARATUS

CROSS-REFERENCE TO RELATED APPLICATIONS

The present application claims priority from Japanese Patent Application No. 2020-161808 filed on Sep. 28, 2020, the entire contents of which are hereby incorporated by reference.

BACKGROUND

The technology relates to a vertical take-off and landing aircraft and a wing apparatus.

Recently, a vertical take-off and landing aircraft has been developed that includes a propulsion device for lifting configured to allow for vertical take-off and vertical landing in addition to main wings configured to allow for horizontal flight or cruising. Examples of such a propulsion device for lifting may include a jet engine and a rotary wing. For example, International Publication (WO) No. 2006/103774 discloses a technique for a vertical take-off and landing aircraft equipped with a lift jet (a propulsion device for lifting) inside a duct running through a main wing. According to the technique, a louver is caused to operate by an actuator when the lift jet is not in operation to thereby cause the duct to be closed. Thus causing the duct to be closed upon horizontal flight of the vertical take-off and landing aircraft makes it possible to reduce air resistance during the horizontal flight. Further, upon vertical take-off and vertical landing, causing the duct to be open allows for vertical take-off and vertical landing by means of the propulsion device for lifting.

SUMMARY

An aspect of the technology provides a vertical take-off and landing aircraft that includes a wing body, a duct, a rotary wing, two or more upper-surface hinges, and two or more upper-surface covers. The wing body includes an upper surface and a lower surface. The duct runs through the wing body from the upper surface to the lower surface. The duct has an upper-surface opening positioned on the upper surface and a lower-surface opening positioned on the lower surface. The rotary wing is provided inside the duct. The upper-surface hinges are provided at the upper-surface opening of the duct. The upper-surface hinges extend in a direction that intersects a moving direction in a case where the vertical take-off and landing aircraft moves forward. The upper-surface covers are pivotally supported respectively by the upper-surface hinges. The upper-surface covers are configured to cause the upper-surface opening of the duct to be open and closed. The upper-surface covers are configured to pivot, upon forward moving of the vertical take-off and landing aircraft, in a closing direction by negative pressure generated on an upper surface side of the wing body, and thereby cause the upper-surface opening of the duct to be closed. The upper-surface covers are configured to pivot, upon hovering of the vertical take-off and landing aircraft, in an opening direction by pressure of an airflow, respective own weights of the upper-surface covers, or both, and thereby cause the upper-surface opening of the duct to be open. The airflow flows in the duct from the upper surface side to a lower surface side in accordance with rotation of the rotary wing.

An aspect of the technology provides a wing apparatus to be provided in a vertical take-off and landing aircraft. The wing apparatus includes a wing body, a duct, a rotary wing, two or more upper-surface hinges, and two or more upper-surface covers. The wing body includes an upper surface and a lower surface. The duct runs through the wing body from the upper surface to the lower surface. The duct has an upper-surface opening positioned on the upper surface and a lower-surface opening positioned on the lower surface. The rotary wing is provided inside the duct. The upper-surface hinges are provided at the upper-surface opening of the duct. The upper-surface hinges extend in a direction that intersects a moving direction in a case where the vertical take-off and landing aircraft moves forward. The upper-surface covers pivotally are supported respectively by the upper-surface hinges. The upper-surface covers are configured to cause the upper-surface opening of the duct to be open and closed. The upper-surface covers are configured to pivot, upon forward moving of the vertical take-off and landing aircraft, in a closing direction by negative pressure generated on an upper surface side of the wing body, and thereby cause the upper-surface opening of the duct to be closed. The upper-surface covers are configured to pivot, upon hovering of the vertical take-off and landing aircraft, in an opening direction by pressure of an airflow, respective own weights of the upper-surface covers, or both, and thereby cause the upper-surface opening of the duct to be open. The airflow flows in the duct from the upper surface side to a lower surface side in accordance with rotation of the rotary wing.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

For example, upon vertical take-off, vertical landing, or hovering, propulsive force of a rotary wing for lifting may be used to support the own weight of the aircraft. Therefore, it may be desired that an opening and closing mechanism for a duct be highly reliable. However, an existing vertical take-off and landing aircraft described in WO No. 2006/103774 has a configuration in which a drive device such as an actuator is used to cause a louver, which causes the duct to be open and closed, to operate. Accordingly, in order to increase reliability of the opening and closing mechanism, for example, redundancy of the actuator may lead to great increase in weight of the aircraft.

It is desirable to provide a vertical take-off and landing aircraft and a wing apparatus that each make it possible to cause a duct of a rotary wing for lifting to be open and closed without using a drive device such as an actuator and to suppress increase in weight.

In the following, some example embodiments of the technology are described in detail with reference to the accompanying drawings. The dimensions, the materials, the specific numerical values, etc. described in the example embodiments are mere examples for facilitating understanding of the technology, and do not limit the technology unless otherwise specified. In the specification and the drawings, elements having substantially the same functions and configurations are denoted by the same reference numerals to omit duplicate descriptions, and elements not directly related to the embodiments of the technology may be omitted.

1. General Configuration of Vertical Take-Off and Landing Aircraft

Figure 1:
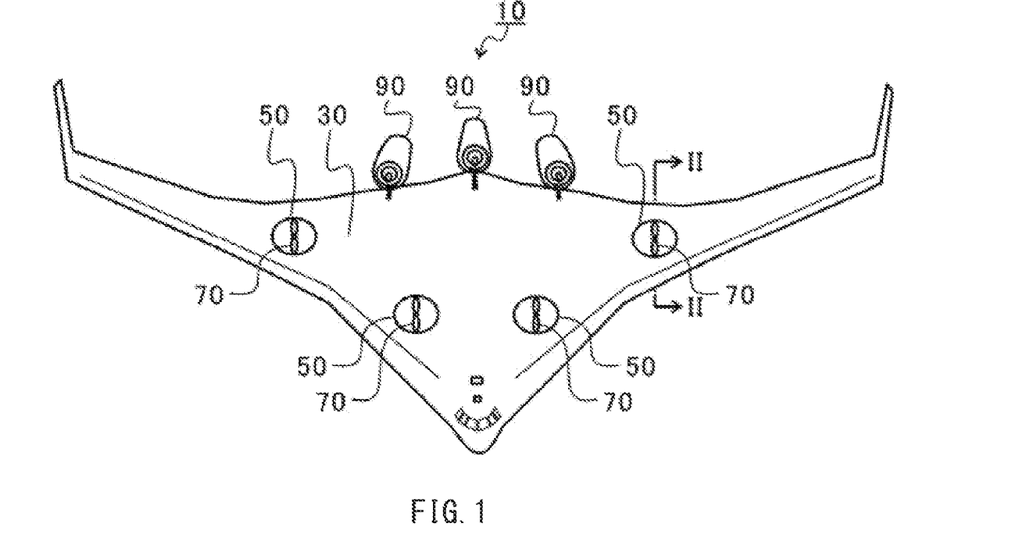
FIG. 1 is an upper perspective view of an example of a vertical take-off and landing aircraft according to an example embodiment of the technology.

First, referring to FIG. 1, a description is given of a general configuration of a vertical take-off and landing aircraft 10 according to an example embodiment of the technology. FIG. 1 is an upper perspective view of the vertical take-off and landing aircraft 10 according to the example embodiment of the technology.

As illustrated in FIG. 1, the vertical take-off and landing aircraft 10 may include, for example but not limited to, a body 30, two or more ducts 50, two or more rotary wings 70, and a forward-move propulsion device 90. The body 30 may be an apparatus having a configuration in which a body of an airframe of the vertical take-off and landing aircraft 10 and a wing body (a wing apparatus) are provided integrally. The body 30 may be provided with, for example but not limited to: a cabin; components including, without limitation, a fuel tank and a battery configured to drive the rotary wings 70 and the forward-move propulsion device 90; and various devices to be mounted on an aircraft. The body 30 may have a vertical cross-section of a wing shape in a front-rear direction of the vertical take-off and landing aircraft 10. Accordingly, the body 30 of the vertical take-off and landing aircraft 10 according to the example embodiment may serve as a wing body (a wing apparatus) that generates upward lift for the vertical take-off and landing aircraft 10.

The example embodiment is described referring to an example in which the body 30 integrating the body of the airframe and the main wing serves as a wing body (a wing apparatus). However, the wing body (the wing apparatus) according to an embodiment of the technology is not limited to such an example. The wing body (the wing apparatus) according to the embodiment of the technology may be any apparatus having a wing shape and generating upward lift for a vertical take-off and landing aircraft. For example, the wing body (the wing apparatus) may be a main wing (a fixed wing) that is provided separately from the body of the airframe.

The duct 50 may be a hollow space that serves as an installation space that allows the rotary wing 70 to be buried in the body 30 (the wing body). The duct 50 may be provided in the body 30, and may have, for example, a cylindrical shape. The duct 50 may run through the body 30 from an upper surface 30US to a lower surface 30LS of the body 30. According to the example embodiment, four ducts 50 may be provided in the body 30. For example, two ducts 50 may be provided on the right side with respect to a center line of the body 30, and the other two ducts 50 may be provided on the left side with respect to the center line of the body 30. The four ducts 50 may be provided symmetrically about the center line of the body 30. The number of the ducts 50 is not limited to four. The number of the ducts 50 may be one, two, three, five, or greater.

The rotary wings 70 may be disposed inside the respective ducts 50 on a one-to-one basis. Accordingly, in the example embodiment, four rotary wings 70 may be disposed in the respective four ducts 50. The rotary wing 70 may be driven to rotate upon vertical take-off, vertical landing, and hovering of the vertical take-off and landing aircraft 10. Upon being driven to rotate, the rotary wing 70 may generate upward lift for the vertical take-off and landing aircraft 10. As described above, the vertical take-off and landing aircraft 10 according to the example embodiment may include the rotary wing 70 as a buried-in-wing and provided-in-duct rotary wing. The rotary wing 70 according to the example embodiment may serve as a propulsion device for lifting (a buried-in-wing and provided-in-duct rotary wing) that generates lift to be used upon vertical take-off and vertical landing of the vertical take-off and landing aircraft 10.

The forward-move propulsion device 90 may generate propulsive force to allow the vertical take-off and landing aircraft 10 to move forward. The forward-move propulsion device 90 may include, for example, a jet engine. The forward-move propulsion device 90 may be provided at a rear end of the body 30. For example, one forward-move propulsion device 90 may be provided in the middle, another forward-move propulsion device 90 may be provided on the left side, and another forward-move propulsion device 90 may be provided on the right side in a left-right direction of the body 30. Thus, the vertical take-off and landing aircraft 10 according to the example embodiment may have a configuration in which the body 30 of the fixed-wing aircraft provided with the forward-move propulsion device 90 is combined with the buried-in-wing provided-in-duct rotary wing 70 serving as a propulsion device for lifting.

2. Configuration of Wing Apparatus

Figure 2:
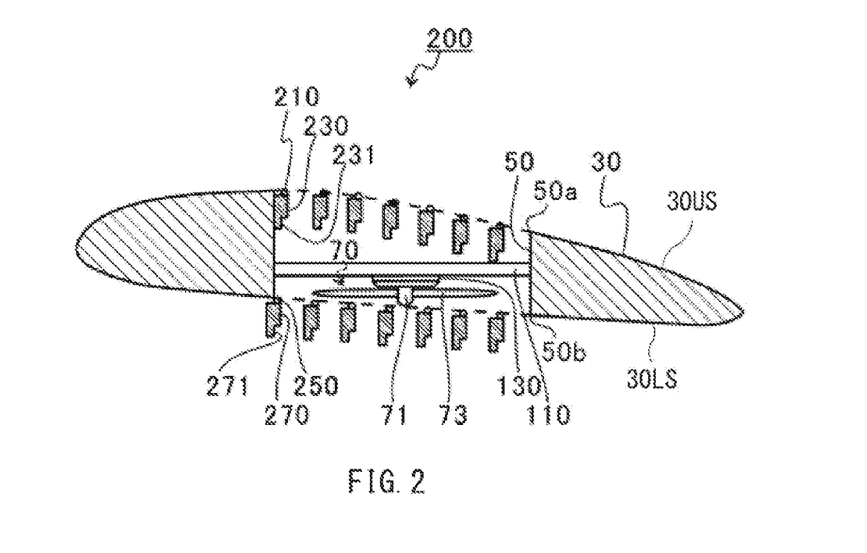
FIG. 2 is a schematic cross-sectional view of an example of a body taken along a line II-II in FIG. 1.

FIG. 2 is a schematic diagram of a cross-section of the body 30 taken in a vertical direction along a line II-II (a position of the wing body) in FIG. 1. In one embodiment, the body 30 may serve as a "wing apparatus" or a "wing body". As illustrated in FIG. 2, the body 30 may have a vertical cross-section of a wing shape that generates upward lift for the vertical take-off and landing aircraft 10. The body 30 may be provided with the duct 50 that runs through from an upper-surface opening 50a to a lower-surface opening 50b. Disposed in the duct 50 may be a support 110, an electric motor 130, and the rotary wing 70.

The support 110 may have, for example, a rod shape. Both ends of the support 110 may be coupled to an inner wall of the duct 50. The support 110 may support the electric motor 130 and the rotary wing 70. The electric motor 130 may cause the rotary wing 70 to rotate with use of electric power supplied from an unillustrated battery. The rotary wing 70 may include a hub 71 and two or more blades 73. The hub 71 may be attached to a rotational shaft of the electric motor 130, and rotate together with the rotational shaft of the electric motor 130. The blades 73 may be coupled to the hub 71, and be rotatable about the hub 71.

Further, the duct 50 may be provided with a duct opening and closing mechanism 200. The duct opening and closing mechanism 200 may include two or more upper-surface hinges 210, two or more upper-surface covers 230, two or more lower-surface hinges 250, and two or more lower-surface covers 270.

The upper-surface hinges 210 and the upper-surface covers 230 may provide a louver-type duct opening and closing mechanism that causes the upper-surface opening 50a of the duct 50 to be open and closed. The upper-surface covers 230 may serve as slats that are disposed in parallel to each other in the louver. The slats may each be an elongated plate-shaped member. The upper-surface hinges 210 may each serve as a hinge that pivotally supports the corresponding one of the upper-surface covers 230 (the slats).

The upper-surface hinges 210 may each have a round rod shape. Both ends of each of the upper-surface hinges 210 may be coupled to the inner wall of the duct 50. The upper-surface hinges 210 may be provided at the upper-surface opening 50a of the duct 50. The upper-surface hinges 210 may each extend in a direction that intersects a moving direction in a case where the vertical take-off and landing aircraft 10 moves forward. According to the example embodiment, the upper-surface hinges 210 may each extend in a direction perpendicular to the moving direction of the vertical take-off and landing aircraft 10, i.e., the left-right direction of the vertical take-off and landing aircraft 10. The upper-surface hinges 210 may be disposed side by side in the front-rear direction of the vertical take-off and landing aircraft 10 and in parallel to each other. The upper-surface hinges 210 may each support corresponding one of the upper-surface covers 230 in such a manner that the corresponding upper-surface cover 230 is pivotable about a central axis of the upper-surface hinge 210.

Figure 4:
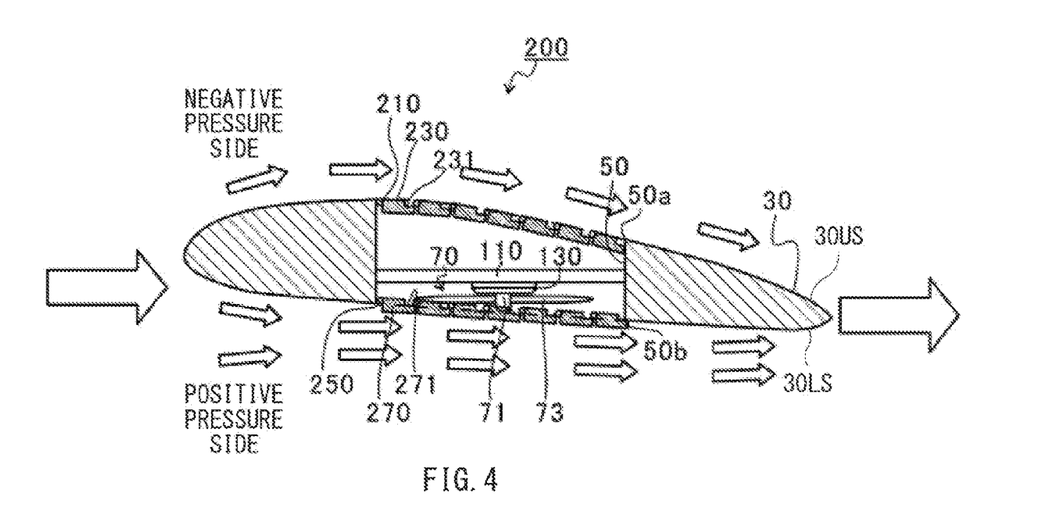
FIG. 4 is a schematic cross-sectional view of an example of a state of the duct opening and closing mechanism at the time of horizontal flight of the vertical take-off and landing aircraft.

The upper-surface covers 230 may have, for example, an elongated plate shape extending in the left-right direction of the vertical take-off and landing aircraft 10. The upper-surface covers 230 may each have one end, i.e., a coupling end, that is supported by the corresponding upper-surface hinge 210. The upper-surface covers 230 may each have the other end that is a movable free end. The upper-surface covers 230 may each have a depression 231 at the end (the free end) opposite to the coupling end coupled to the upper-surface hinge 210. The depression 231 may be recessed from the upper surface of the upper-surface cover 230 toward the lower surface thereof. The depression 231 may have a depth that is approximately the same as the diameter of the upper-surface hinge 210. Factors including, without limitation, the shapes and the positions of the upper-surface covers 230 and the depressions 231 may be adjusted in such a manner that, when each of the upper-surface covers 230 pivots about the central axis of the upper-surface hinge 210 in a closing direction as illustrated in FIG. 4, the depression 231 of the upper-surface cover 230 comes into contact with the upper-surface hinge 210 of an adjacent one of the upper-surface covers 230. When the depression 231 of the upper-surface cover 230 comes into contact with the upper-surface hinge 210 of the adjacent upper-surface cover 230, the depression 231 may contain that upper-surface hinge 210.

Figure 3:
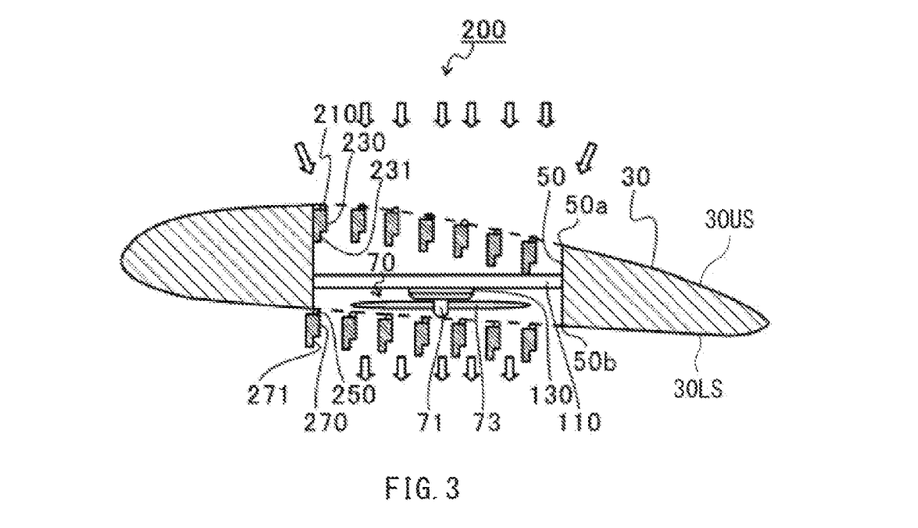
FIG. 3 is a schematic cross-sectional view of an example of a state of a duct opening and closing mechanism at the time when the rotary wing is driven to rotate.

Further, when the upper-surface covers 230 pivot in the closing direction until the depressions 231 come into contact with the respective upper-surface hinges 210, the upper-surface covers 230 may cause the upper-surface opening 50a of the duct 50 to be closed, as illustrated in FIG. 4. In contrast, when the upper-surface covers 230 pivot in an opening direction and the depressions 231 are away from the respective upper-surface hinges 210, the upper-surface covers 230 may cause the upper-surface opening 50a of the duct 50 to be open, as illustrated in FIG. 3. As described above, the upper-surface covers 230 may be pivotally supported by the respective upper-surface hinges 210, and may be configured to cause the upper-surface opening 50a of the duct 50 to be open and closed. Note that, when the vertical take-off and landing aircraft 10 is stopped, the upper-surface covers 230 may pivot about the respective upper-surface hinges 210 vertically downward by their own weights, as illustrated in FIG. 2.

The lower-surface hinges 250 and the lower-surface covers 270 may provide a louver-type duct opening and closing mechanism that causes the lower-surface opening 50b of the duct 50 to be open and closed. The lower-surface covers 270 may serve as slats that are disposed in parallel to each other in the louver. The slats may each be an elongated plate-shaped member. The lower-surface hinges 250 may each serve as a hinge that pivotally supports the corresponding one of the lower-surface covers 270 (the slats).

The lower-surface hinges 250 may each have a round rod shape. Both ends of each of the lower-surface hinges 250 may be coupled to the inner wall of the duct 50. The lower-surface hinges 250 may be provided at the lower-surface opening 50b of the duct 50. The lower-surface hinges 250 may each extend in a direction that intersects the moving direction in the case where the vertical take-off and landing aircraft 10 moves forward. According to the example embodiment, the lower-surface hinges 250 may each extend in the direction perpendicular to the moving direction of the vertical take-off and landing aircraft 10, i.e., the left-right direction of the vertical take-off and landing aircraft 10. The lower-surface hinges 250 may be disposed side by side in the front-rear direction of the vertical take-off and landing aircraft 10 and in parallel to each other. The lower-surface hinges 250 may each support corresponding one of the lower-surface covers 270 in such a manner that the corresponding lower-surface cover 270 is pivotable about a central axis of the lower-surface hinge 250.

The lower-surface covers 270 may have, for example, an elongated plate shape extending in the left-right direction of the vertical take-off and landing aircraft 10. The lower-surface covers 270 may each have one end, i.e., a coupling end, that is supported by the corresponding lower-surface hinge 250. The lower-surface covers 270 may each have the other end that is a movable free end. The lower-surface covers 270 may each have a depression 271 at the end (the free end) opposite to the coupling end coupled to the lower-surface hinge 250. The depression 271 may be recessed from the upper surface of the lower-surface cover 270 toward the lower surface thereof. The depression 271 may have a depth that is approximately the same as the diameter of the lower-surface hinge 250. Factors including, without limitation, the shapes and the positions of the lower-surface covers 270 and the depressions 271 may be adjusted in such a manner that, when each of the lower-surface covers 270 pivots about the central axis of the lower-surface hinge 250 in a closing direction as illustrated in FIG. 4, the depression 271 of the lower-surface cover 270 comes into contact with the lower-surface hinge 250 of an adjacent one of the lower-surface covers 270. When the depression 271 of the lower-surface cover 270 comes into contact with the lower-surface hinge 250 of the adjacent lower-surface cover 270, the depression 271 may contain that lower-surface hinge 250.

Further, when the lower-surface covers 270 pivot in the closing direction until the depressions 271 come into contact with the respective lower-surface hinges 250, the lower-surface covers 270 may cause the lower-surface opening 50b of the duct 50 to be closed, as illustrated in FIG. 4. In contrast, when the lower-surface covers 270 pivot in an opening direction and the depressions 271 are away from the respective lower-surface hinges 250, the lower-surface covers 270 may cause the lower-surface opening 50b of the duct 50 to be open, as illustrated in FIG. 3. As described above, the lower-surface covers 270 may be pivotally supported by the respective lower-surface hinges 250, and may be configured to cause the lower-surface opening 50b of the duct 50 to be open and closed. Note that, when the vertical take-off and landing aircraft 10 is stopped, the lower-surface covers 270 may pivot about the respective lower-surface hinges 250 vertically downward by their own weights, as illustrated in FIG. 2.

3. Operation of Duct Opening and Closing Mechanism

Referring to FIGS. 3 and 4, operation of the duct opening and closing mechanism 200 according to the example embodiment is described below. In FIGS. 3 and 4, flows of air are indicated by white arrows. FIG. 3 is a schematic cross-sectional view of a state of the duct opening and closing mechanism 200 at the time when the rotary wing 70 is driven to rotate.

As illustrated in FIG. 3, upon vertical take-off, vertical landing, or hovering of the vertical take-off and landing aircraft 10, when the rotary wing 70 is driven to rotate, the air may flow from the upper-surface opening 50a of the duct 50 toward the lower-surface opening 50b thereof. In this case, the upper-surface covers 230 may pivot about the respective upper-surface hinges 210, which pivotally support the upper-surface covers 230, in the opening direction, downward from the upper-surface opening 50a by the pressure of downflow air and their own weights. As a result, the upper-surface covers 230 may be brought into an opening state that causes the upper-surface opening 50a of the duct 50 to be open.

In a similar manner, the lower-surface covers 270 may pivot about the respective lower-surface hinges 250, which pivotally support the lower-surface covers 270, in the opening direction, downward from the lower-surface opening 50b by the pressure of downflow air and their own weights. As a result, the lower-surface covers 270 may be brought into an opening state that causes the lower-surface opening 50b of the duct 50 to be open.

When the rotary wing 70 is driven to rotate, bringing the upper-surface covers 230 into the opening state may allow air above the upper-surface opening 50a to flow into the duct 50 through the upper-surface opening 50a. Further, when the rotary wing 70 is driven to rotate, bringing the lower-surface covers 270 into the opening state may allow the air in the duct 50 to flow to the outside of the duct 50 through the lower-surface opening 50b. Thus, upon hovering of the vertical take-off and landing aircraft 10, the duct opening and closing mechanism 200 may swiftly cause the upper-surface opening 50a and the lower-surface opening 50b of the duct 50 to be open, making it possible to support the own weight of the vertical take-off and landing aircraft 10 with use of lift generated by the rotary wing 70.

FIG. 4 is a schematic cross-sectional view of a state of the duct opening and closing mechanism 200 at the time when the vertical take-off and landing aircraft 10 performs horizontal flight (cruising). Note that FIG. 4 illustrates a rotation stop state in which the rotation of the rotary wing 70 is stopped.

As illustrated in FIG. 4, upon horizontal flight of the vertical take-off and landing aircraft 10, air may flow from the front side of the aircraft toward the rear side thereof on an upper surface 30US side and a lower surface 30LS side of the wing-shaped body 30. In one embodiment, the body 30 may serve as the "wing body". In this case, the pressure of the air flowing on the lower surface 30LS side of the body 30 having the wing shape that generates lift may be higher than the pressure of the air flowing on the upper surface 30US side of the body 30. For example, the pressure of the air flowing on the lower surface 30LS side of the body 30 may be positive pressure P1 that is higher than the atmospheric pressure. The pressure of the air flowing on the upper surface 30US side of the body 30 may be negative pressure P2 that is lower than the atmospheric pressure. Note that the negative pressure P2 may be lower than the atmospheric pressure but have a positive value (positive pressure P1>atmospheric pressure>negative pressure P2>0). Thus, upon the horizontal flight of the vertical take-off and landing aircraft 10, the pressure on the upper surface 30US side of the body 30 and the pressure on the lower surface 30LS side of the body 30 may have a pressure difference $\Delta P$ ($\Delta P = P1 - P2$) therebetween. The body 30 may have the wing shape that generates lift with use of such a pressure difference $\Delta P$ between the upper surface 30US side and the lower surface 30LS side.

In this case, the upper-surface covers 230 may receive force pulling upward resulting from the negative pressure of the air flowing on the upper surface 30US side of the body 30. The upper-surface covers 230 may thereby pivot in the closing direction to cause the upper-surface opening 50a to be closed. In more detail, the upper-surface covers 230 may pivot about the respective upper-surface hinges 210 in the closing direction (i.e., toward the upper side in FIG. 4) approaching the upper-surface opening 50a by the negative pressure of the air flowing on the upper surface 30US side of the body 30. Accordingly, the depressions 231 of the respective upper-surface covers 230 may come into contact with the respective upper-surface hinges 210. As a result, the upper-surface covers 230 may be brought into a closing state that causes the upper-surface opening 50a of the duct 50 to be closed, as illustrated in FIG. 4. At this time, the upper surfaces of the upper-surface covers 230 may be approximately the same plane as the upper surface 30US of the body 30, reducing air resistance. The upper-surface hinges 210 may each be positioned on the front side of the corresponding upper-surface cover 230, i.e., on the upstream side of the airflow with respect to the corresponding upper-surface cover 230.

The lower-surface covers 270 may pivot in the closing direction by receiving an airflow while being in the opening state, and thereby cause the lower-surface opening 50b of the duct 50 to be closed. Further, the lower-surface covers 270 may receive force pushing upward resulting from the positive pressure of the air flowing on the lower surface 30LS side of the body 30, and thereby keep causing the lower-surface opening 50b to be closed also after pivoting in the closing direction to cause the lower-surface opening 50b to be closed. In more detail, the lower-surface covers 270 may pivot about the respective lower-surface hinges 250 in the closing direction (i.e., toward the upper side in FIG. 4) approaching the lower-surface opening 50b by receiving the airflow flowing on the lower surface 30LS side of the body 30. Accordingly, the depressions 271 of the respective lower-surface covers 270 may come into contact with the respective lower-surface hinges 250. As a result, the lower-surface covers 270 may be brought into a closing state that causes the lower-surface opening 50b of the duct 50 to be closed, as illustrated in FIG. 4. At this time, the lower surfaces of the lower-surface covers 270 may be approximately the same plane as the lower surface 30LS of the body 30, reducing air resistance. The lower-surface hinges 250 may each be positioned on the front side of the corresponding lower-surface cover 270, i.e., on the upstream side of the airflow with respect to the corresponding lower-surface cover 270.

4. Summary

As described above, the vertical take-off and landing aircraft 10 according to the example embodiment may include the forward-move propulsion device 90 as a propulsion device for forward moving, and the buried-in-wing and provided-in-duct rotary wing 70 as a propulsion device for lifting to be used upon vertical take-off, vertical landing, and hovering. The vertical take-off and landing aircraft 10 according to the example embodiment may thus have an advantage that the combination of the forward-move propulsion device 90 and the rotary wing 70 for lifting having optimized shapes is providable. In contrast, an existing structure having such a combination may have an issue that the rotary wing for lifting causes great air resistance upon horizontal flight (cruising) in which the aircraft moves forward at a high speed.

To address the above, as in the example embodiment, the rotary wing 70 for lifting may be buried in the duct 50 of the wing body to thereby reduce air resistance on the rotary wing 70. Further, upon horizontal flight of the vertical take-off and landing aircraft 10, if the duct 50 is open, air may flow into the duct 50, and the incoming air may collide with a part such as the inner wall of the duct 50 or the rotary wing 70, causing increase in air resistance. Therefore, it may be favorable to cause the duct 50 to be closed upon the horizontal flight of the vertical take-off and landing aircraft 10 to reduce the air flowing into the duct 50, thereby reducing air resistance.

In terms of the above, an existing technique has a configuration having a drive device such as an actuator to cause the duct 50 to be open and closed and causing a louver, which causes the duct 50 to be open or closed, to operate by a drive force of the drive device. However, in order to increase reliability of the opening and closing mechanism, for example, redundancy of the actuator may lead to a great increase in the weight of the aircraft.

To address this, according to the example embodiment, the duct opening and closing mechanism 200 that is non-powered as described above may be provided. With such a configuration, it is possible to cause the duct 50 of the rotary wing 70 for lifting to be open and closed without using a drive device such as an actuator and is also possible to suppress increase in weight.

In more detail, the duct opening and closing mechanism 200 according to the example embodiment includes the upper-surface hinges 210 and the upper-surface covers 230. Upon horizontal flight (cruising) of the vertical take-off and landing aircraft 10 at a predetermined speed of forward moving, the upper-surface covers 230 may pivot in the closing direction by negative pressure generated on the upper surface 30US side of the body 30, and thereby cause the upper-surface opening 50a of the duct 50 to be closed without using power. Upon vertical take-off, vertical landing, or hovering of the vertical take-off and landing aircraft 10, the upper-surface covers 230 may pivot in the opening direction by: pressure of an airflow flowing in the duct 50 from the upper surface 30US side to the lower surface 30LS side in accordance with rotation of the rotary wing 70; own weights of the respective upper-surface covers 230; or both. The upper-surface covers 230 may thereby cause the upper-surface opening 50a of the duct 50 to be open without using power.

With such a configuration, upon the horizontal flight of the vertical take-off and landing aircraft 10, the upper-surface cover 230 may cause the upper-surface opening 50a of the duct 50 to be closed. This makes it possible to reduce the air resistance of the body 30 serving as the wing body. Upon vertical take-off, vertical landing, or hovering of the vertical take-off and landing aircraft 10, the upper-surface covers 230 may swiftly cause the upper-surface opening 50a to open without using power. Accordingly, the own weight of the vertical take-off and landing aircraft 10 is allowed to be supported by the lift generated by the rotary wing 70. It is therefore possible to provide a highly reliable non-powered opening and closing mechanism. In addition, this makes the drive device such as an actuator adapted to open and close the upper-surface covers 230 omittable, solving the issue of increase in weight due to the redundancy of the drive device. As a result, it is possible to suppress increase in weight of the vertical take-off and landing aircraft 10 while allowing the upper-surface opening 50a of the duct 50 to be open and closed without using power.

Further, the duct opening and closing mechanism 200 according to the example embodiment may include the lower-surface hinges 250 and the lower-surface covers 270. Upon the horizontal flight (cruising) of the vertical take-off and landing aircraft 10, the lower-surface covers 270 may pivot in the closing direction by positive pressure generated on the lower surface 30LS side of the body 30, and thereby cause the lower-surface opening 50b of the duct 50 to be closed without using power. Upon vertical take-off, vertical landing, or hovering of the vertical take-off and landing aircraft 10, the lower-surface covers 270 may pivot in the opening direction by: pressure of an airflow flowing in the duct 50 from the upper surface 30US side to the lower surface 30LS side in accordance with the rotation of the rotary wing 70; own weights of the respective lower-surface covers; or both. The lower-surface covers 270 may thereby cause the lower-surface opening 50b of the duct 50 to be open without using power.

With such a configuration, upon horizontal flight of the vertical take-off and landing aircraft 10, the lower-surface cover 270 may cause the lower-surface opening 50b of the duct 50 to be closed. This makes it possible to reduce air resistance of the body 30 serving as the wing body. Upon vertical take-off, vertical landing, or hovering of the vertical take-off and landing aircraft 10, the lower-surface covers 270 may swiftly cause the lower-surface opening 50b to open without using power. Accordingly, the own weight of the vertical take-off and landing aircraft 10 is allowed to be supported by the lift generated by the rotary wing 70. It is therefore possible to provide a highly reliable non-powered opening and closing mechanism. In addition, this makes the drive device such as an actuator adapted to open and close the lower-surface covers 270 omittable, solving the issue of increase in weight due to the redundancy of the drive device. As a result, it is possible to suppress increase in weight of the vertical take-off and landing aircraft 10 while allowing the lower-surface opening 50b of the duct 50 to be open and closed without using power.

Further, the vertical take-off and landing aircraft 10 according to the example embodiment may include the forward-move propulsion device 90, separately from the propulsion device for lifting, i.e., the rotary wing 70 for lifting. With this configuration, it is possible to use a propulsion device for forward moving and a propulsion device for lifting that are optimized for their respective applications. Further, providing the vertical take-off and landing aircraft 10 with the forward-move propulsion device 90 makes it possible to increase the negative pressure generated on the upper surface 30US side of the body 30 and the positive pressure generated on the lower surface 30LS side of the body 30 upon horizontal flight of the vertical take-off and landing aircraft 10, as compared with a case where the forward-move propulsion device 90 is not provided. As a result, it is possible to easily bring the upper-surface covers 230 and the lower-surface covers 270 from the opening state to the closing state.

Further, the vertical take-off and landing aircraft 10 according to the example embodiment may include the electric motor 130 configured to drive the rotary wing 70 for lifting to rotate. With this configuration, it is possible to simplify the system, as compared with a case where a lift jet is used as a power source for vertical take-off and vertical landing, for example.

Although some example embodiments of the technology have been described with reference to the accompanying drawings, the technology is by no means limited to the example embodiments described above. It should be appreciated that modifications and alterations may be made by persons skilled in the art without departing from the scope as defined by the appended claims. The technology is intended to include such modifications and alterations in the technical scope thereof.

The example embodiment above has been described referring to an example in which the duct opening and closing mechanism 200 includes the lower-surface hinges 250 and the lower-surface covers 270; however, this is non-limiting. The lower-surface hinges 250 and the lower-surface covers 270 are not necessarily provided. For example, the duct opening and closing mechanism 200 may include no lower-surface hinge 250 or no lower-surface cover 270.

The example embodiment above has been described referring to an example in which the vertical take-off and landing aircraft 10 includes the forward-move propulsion device 90; however, this is non-limiting. The forward-move propulsion device is not necessarily provided. For example, no forward-move propulsion device may be provided and the direction of a portion of the rotary wings 70 (the rotary wings for lifting) provided for vertical take-off and vertical landing may be variable. With such a configuration, the rotary wings 70 (the rotary wings for lifting) provided for vertical take-off and vertical landing may be also used as the propulsion device for forward moving (a rotary wing for forward moving).

The example embodiment above has been described referring to an example in which the forward-move propulsion device 90 includes a jet engine; however, this is non-limiting. As long as the forward-move propulsion device generates propulsive force to cause the vertical take-off and landing aircraft to move forward, the forward-move propulsion device may be any other device, for example, a rotary wing. In this case, an electric motor may be provided as a power source to drive the rotary wing for forward moving to rotate. With this configuration, it is possible to reduce the airframe weight, as compared with a case of using a lift jet as the power source for forward moving, for example.

The example embodiment above has been described referring to an example in which the electric motor 130 is provided in the duct 50 as a power source configured to cause the rotary wing 70 to rotate; however, this is non-limiting. For example, a lift jet may be provided as a power source instead of the electric motor 130.

The invention claimed is:

1. A vertical take-off and landing aircraft comprising:
   a wing body including an upper surface and a lower surface;
   a duct running through the wing body from the upper surface to the lower surface, the duct having an upper-surface opening positioned on the upper surface and a lower-surface opening positioned on the lower surface;
   a rotary wing provided inside the duct;
   two or more upper-surface hinges provided at the upper-surface opening of the duct, the upper-surface hinges extending in a direction that intersects a moving direction in a case where the vertical take-off and landing aircraft moves forward; and
   two or more upper-surface covers pivotally supported respectively by the upper-surface hinges, the upper-surface covers being configured to cause the upper-surface opening of the duct to be open and closed, wherein
   the upper-surface covers are configured to pivot, upon forward moving of the vertical take-off and landing aircraft, in a closing direction by negative pressure generated on an upper surface side of the wing body, and thereby cause the upper-surface opening of the duct to be closed, and
   the upper-surface covers are configured to pivot, upon hovering of the vertical take-off and landing aircraft, in an opening direction by pressure of an airflow, respective own weights of the upper-surface covers, or both, and thereby cause the upper-surface opening of the duct to be open, the airflow flowing in the duct from the upper surface side to a lower surface side in accordance with rotation of the rotary wing.

2. The vertical take-off and landing aircraft according to claim 1, further comprising:
   two or more lower-surface hinges provided at the lower-surface opening of the duct, the lower-surface hinges extending in a direction that intersects the moving direction in the case where the vertical take-off and landing aircraft moves forward; and
   two or more lower-surface covers pivotally supported respective by the lower-surface hinges, the lower-surface covers being configured to cause the lower-surface opening of the duct to be open and closed, wherein
   the lower-surface covers are configured to pivot, upon the forward moving of the vertical take-off and landing aircraft, in a closing direction by receiving an airflow while being in an opening state, and thereby cause the lower-surface opening of the duct to be closed, the lower-surface covers being configured to keep causing the lower-surface opening of the duct to be closed by positive pressure generated on the lower surface side of the wing body also after pivoting in the closing direction, and
   the lower-surface covers are configured to pivot, upon the hovering of the vertical take-off and landing aircraft, in an opening direction by pressure of an airflow, respective own weights of the lower-surface covers, or both, and thereby cause the lower-surface opening of the duct to be open, the airflow flowing in the duct from the upper surface side to the lower surface side in accordance with the rotation of the rotary wing.

3. The vertical take-off and landing aircraft according to claim 1, further comprising a forward-move propulsion device configured to allow the vertical take-off and landing aircraft to move forward.

4. The vertical take-off and landing aircraft according to claim 2, further comprising a forward-move propulsion device configured to allow the vertical take-off and landing aircraft to move forward.

5. The vertical take-off and landing aircraft according to claim 1, further comprising
an electric motor, wherein
at least the rotary wing is configured to be driven by the electric motor.

6. The vertical take-off and landing aircraft according to claim 2, further comprising
an electric motor, wherein
at least the rotary wing is configured to be driven by the electric motor.

7. The vertical take-off and landing aircraft according to claim 3, further comprising
an electric motor, wherein
at least the rotary wing is configured to be driven by the electric motor.

8. The vertical take-off and landing aircraft according to claim 4, further comprising
an electric motor, wherein
at least the rotary wing is configured to be driven by the electric motor.

9. A wing apparatus to be provided in a vertical take-off and landing aircraft, the wing apparatus comprising:
a wing body including an upper surface and a lower surface;
a duct running through the wing body from the upper surface to the lower surface, the duct having an upper-surface opening positioned on the upper surface and a lower-surface opening positioned on the lower surface;
a rotary wing provided inside the duct;
two or more upper-surface hinges provided at the upper-surface opening of the duct, the upper-surface hinges extending in a direction that intersects a moving direction in a case where the vertical take-off and landing aircraft moves forward; and
two or more upper-surface covers pivotally supported respectively by the upper-surface hinges, the upper-surface covers being configured to cause the upper-surface opening of the duct to be open and closed, wherein
the upper-surface covers are configured to pivot, upon forward moving of the vertical take-off and landing aircraft, in a closing direction by negative pressure generated on an upper surface side of the wing body, and thereby cause the upper-surface opening of the duct to be closed, and
the upper-surface covers are configured to pivot, upon hovering of the vertical take-off and landing aircraft, in an opening direction by pressure of an airflow, respective own weights of the upper-surface covers, or both, and thereby cause the upper-surface opening of the duct to be open, the airflow flowing in the duct from the upper surface side to a lower surface side in accordance with rotation of the rotary wing.

* * * * *